a2

United States Patent
Swanberg (10) Patent No.: US 9,470,032 B2
(45) Date of Patent: Oct. 18, 2016

(54) DOOR STOP DEVICE AND METHOD

(71) Applicant: DoorDots, LLC, Lexington, KY (US)

(72) Inventor: Arthur Swanberg, Lexington, KY (US)

(73) Assignee: DOORDOTS, LLC, Lexington, KY (US)

( * ) Notice: Subject to any disclaimer, the term of this patent is extended or adjusted under 35 U.S.C. 154(b) by 0 days.

(21) Appl. No.: 14/740,801

(22) Filed: Jun. 16, 2015

(65) Prior Publication Data

US 2015/0361707 A1    Dec. 17, 2015

Related U.S. Application Data

(60) Provisional application No. 62/012,916, filed on Jun. 16, 2014.

(51) Int. Cl.
 *E05F 5/02* (2006.01)
 *E05F 5/06* (2006.01)
 *F16B 1/00* (2006.01)

(52) U.S. Cl.
 CPC .............. *E05F 5/06* (2013.01); *E05Y 2201/46* (2013.01); *F16B 2001/0035* (2013.01); *Y10T 16/61* (2015.01); *Y10T 16/615* (2015.01)

(58) Field of Classification Search
 CPC . Y10T 16/61; Y10T 16/625; Y10T 16/6285; Y10T 292/11; Y10T 292/15; Y10T 292/19; E05C 17/52; E05C 17/54; E05C 17/56; E05C 17/446; E05C 19/16; E05C 19/18; E05C 19/184; E05F 5/06; E05Y 2201/20; E05Y 2201/21; E05Y 2201/218; E05Y 2201/224; E05Y 2201/46; E06B 1/045; F16B 2001/0035
 See application file for complete search history.

(56) References Cited

U.S. PATENT DOCUMENTS

| | | | | |
|---|---|---|---|---|
| 2,496,691 | A | | 2/1950 | Berry |
| 2,497,697 | A | * | 2/1950 | Smith ..................... E05C 17/56 16/82 |
| 2,761,718 | A | | 9/1956 | Tool |
| 2,815,236 | A | * | 12/1957 | Lowinski ................ E05C 17/56 292/251.5 |
| 2,888,289 | A | * | 5/1959 | Scott ....................... E05C 17/56 292/201 |
| 2,955,239 | A | | 10/1960 | Rouse |
| 3,244,443 | A | * | 4/1966 | Rodgers .................. E05C 17/56 16/82 |
| 3,258,285 | A | | 6/1966 | Smith |
| 3,420,562 | A | | 1/1969 | Simon |

(Continued)

FOREIGN PATENT DOCUMENTS

| | | | | |
|---|---|---|---|---|
| DE | 10336433 | A1 | * 3/2005 | ............. E05C 17/56 |
| FR | 2895434 | A1 | * 6/2007 | ............. E05C 17/56 |

(Continued)

OTHER PUBLICATIONS

WIPO, U.S. International Search Authority, International Search Report and Written Opinion mailed Sep. 1, 2015 in International Patent Application No. PCT/US2015/035995, 9 pages.

*Primary Examiner* — Chuck Mah
(74) *Attorney, Agent, or Firm* — Inskeep IP Group, Inc.

(57) ABSTRACT

A door stop device is described, having a first magnet connected to a door and a second magnet connected to a floor. The first magnet can be mounted on a movable arm so as to allow the first magnet to move upwards and downwards. The arm can be bias in an upward position via a spring or a third magnet so as to be maintained in an upward position when the first and second magnets are not aligned, but moves downward when the first and second magnets are aligned.

14 Claims, 7 Drawing Sheets

(56) References Cited

U.S. PATENT DOCUMENTS

| | | | |
|---|---|---|---|
| 3,647,165 A | | 3/1972 | Whitla |
| 3,691,688 A | | 9/1972 | Kaiserswerth |
| 3,737,186 A | * | 6/1973 | Chezem ................ E05C 17/443 292/338 |
| 3,744,833 A | | 7/1973 | Berducone |
| 3,790,197 A | | 2/1974 | Parker |
| 3,791,687 A | | 2/1974 | Schroeder |
| 4,364,019 A | | 12/1982 | Hütter |
| 4,401,346 A | * | 8/1983 | Jones ..................... E05C 17/56 292/144 |
| 4,434,524 A | | 3/1984 | Gilchrist |
| 4,505,502 A | | 3/1985 | Tomita |
| 4,682,801 A | | 7/1987 | Cook et al. |
| 4,995,655 A | * | 2/1991 | Freeman ................ E05C 17/56 292/251.5 |
| 5,485,733 A | | 1/1996 | Hoffman |
| 5,603,141 A | * | 2/1997 | Gledhill .................... E05F 5/06 16/86 A |
| 5,771,533 A | | 6/1998 | Kuang-Pin |
| 5,782,512 A | | 7/1998 | Cargnoni |
| 5,887,917 A | * | 3/1999 | Luciana ................ E05C 17/56 16/82 |
| 5,944,368 A | | 8/1999 | Hastings |
| 6,135,515 A | | 10/2000 | Roth et al. |
| 6,167,589 B1 | | 1/2001 | Leudtke |
| 6,408,484 B1 | | 6/2002 | Vandertouw |
| 6,489,871 B1 | | 12/2002 | Barton |
| 6,588,811 B1 | | 7/2003 | Ferguson |
| 6,866,312 B1 | | 3/2005 | Rhyneer |
| 7,533,443 B2 | | 5/2009 | Benner |
| 7,571,694 B2 | | 8/2009 | Boerner |
| 7,819,441 B1 | | 10/2010 | Coman et al. |
| 8,051,535 B2 | | 11/2011 | Cheng |
| 8,060,982 B2 | | 11/2011 | Magoz et al. |
| 8,382,169 B2 | * | 2/2013 | Bosshard ................ E05C 17/56 292/251.5 |
| 8,403,382 B2 | * | 3/2013 | Della-Santa ............ E05C 17/02 16/82 |
| 8,449,000 B2 | | 5/2013 | Rhyneer |
| 8,567,831 B2 | | 10/2013 | Roti |
| 8,601,740 B2 | | 12/2013 | Tu et al. |
| 8,602,465 B2 | | 12/2013 | Holmgren |
| 8,727,397 B1 | | 5/2014 | McDonald |
| 8,955,891 B2 | | 2/2015 | Millsap |
| 9,004,550 B2 | | 4/2015 | Carabalona et al. |
| 2004/0045128 A1 | * | 3/2004 | Frushour ................ E05C 17/56 16/82 |
| 2004/0104584 A1 | * | 6/2004 | Ferguson .............. E05B 1/0007 292/251.5 |
| 2005/0000059 A1 | | 1/2005 | Sung et al. |
| 2005/0229358 A1 | | 10/2005 | Barone |
| 2007/0113376 A1 | * | 5/2007 | Frushour ................ E05C 17/56 16/83 |
| 2009/0139050 A1 | * | 6/2009 | Junkins ................... E05C 17/54 16/84 |
| 2010/0045054 A1 | | 2/2010 | Holmgren |
| 2011/0049911 A1 | | 3/2011 | Bosshard |
| 2011/0225890 A1 | | 9/2011 | Greenwood et al. |
| 2011/0298226 A1 | | 12/2011 | Roti |
| 2013/0020815 A1 | | 1/2013 | Smith |
| 2013/0056306 A1 | | 3/2013 | Lee et al. |
| 2013/0160366 A1 | | 6/2013 | Tu et al. |
| 2013/0255033 A1 | * | 10/2013 | Vu ............................. E05F 5/06 16/82 |
| 2014/0001775 A1 | * | 1/2014 | Mullenbach .......... E05C 19/188 292/288 |
| 2014/0001938 A1 | | 1/2014 | Migli |
| 2014/0047677 A1 | | 2/2014 | Trinh |

FOREIGN PATENT DOCUMENTS

| | | | | |
|---|---|---|---|---|
| GB | 1137728 A | | 12/1968 | |
| GB | 1480969 A | * | 7/1977 | ............ E05C 17/48 |
| JP | 06221045 A | * | 8/1994 | |
| JP | 08270311 A | * | 10/1996 | |
| JP | 2002038802 A | * | 2/2002 | |
| JP | 2010281179 A | * | 12/2010 | |
| JP | 2012021279 A | * | 2/2012 | |
| WO | WO 0136771 A1 | * | 5/2001 | ................ E05F 5/00 |
| WO | WO2006/114612 A1 | | 11/2006 | |
| WO | WO2011/039739 A1 | | 4/2011 | |

* cited by examiner

DOOR STOP DEVICE AND METHOD

RELATED APPLICATIONS

This application claims priority U.S. Provisional Application Ser. No. 62/012,916 filed Jun. 16, 2014 entitled Door Stop Device and Method, which is hereby incorporated herein by reference in its entirety.

BACKGROUND OF THE INVENTION

Devices that use magnets to hold a door open or to prevent a door from opening too wide are well documented in the art. Typical devices can be divided into 2 categories. The first category is devices that have a unit that attaches to a door and a unit that attaches to the wall. These devices prevent the door from slamming against the wall and they use magnetic force to prevent the door from closing. However, they require tools and screws to install; they require a wall for one component; they rely on a direct pull force to disengage the magnets, which can be difficult to disengage, and they only hold the door open to its widest position against a wall. The second category is devices that have a unit that attaches to a door and a unit that attaches to the floor. They prevent the door from slamming against the wall and they use magnetic force to prevent the door from closing. However, they require tools and screws to install; they are large and obtrusive, and present a tripping hazard; they rely on a direct pull force to disengage the magnets, which can be difficult to disengage; and they cannot adjust to differing heights between the bottom of the door and the floor.

SUMMARY OF THE INVENTION

Various embodiments of the invention include an adjustable-height magnet attached to the door and a second, low profile magnet attached to the floor. The adjustable-height door magnet and the floor magnet are aligned in such a way that when the door-mounted, adjustable-height magnet passes over the floor-mounted magnet, the opposing polarities of the magnets form an attraction causing the door-mounted magnet to slide down and connect to the floor-mounted magnet, holding the door firmly in place anywhere along the door's arc, preventing the door from closing, opening too wide or to hold the door open a specific amount to let in air or pets.

Various embodiments of the invention also provide an easy mechanism to close the door by simply pulling or pushing the door, which separates the door and floor magnets using a lateral pull force, which requires a lower amount of pull force than a direct pull force between magnets.

In various embodiments, when the door magnet and the floor magnet are separated, the door magnet retracts using a spring mechanism within the case of the door magnet to lift the adjustable arm, so the door can swing freely and shut easily.

According to specific embodiments, the door unit consists of an adjustable arm that lowers the door magnet when positioned over the floor magnet. The sliding arm is held in the up position using a spring and both the sliding arm and the spring are in a case attached to the door. The door magnet is attached to the sliding arm through a hinge mechanism and the magnet is held perpendicular to the floor by a small magnet on the case, which attracts the door magenta when the sliding arm is in the up position. In various embodiments of the invention, the case is held to the door by an adhesive material such as double-sided tape or double-sided foam.

When the floor magnet is encountered, the door magnet swivels on the hinge and rotates 90 degrees so the magnet is parallel to the floor and the floor magnet, which increases the magnetic attraction between the door magnet and the floor magnet. As the magnetic force draws the door magnet and the floor magnet closer together, the spring in the arm compresses so the arm and attached door magnet move to the down position, allowing the door magnet and the floor magnet to move closer together, forming a tighter bond and holding the door in place.

In various embodiments of the invention, the door magnet is attached directly to the adjustable arm so no hinge is needed. When the magnet on the floor is encountered, the spring compresses and the arm slides straight down so the door magnet and the floor magnet can connect.

In various embodiments, the case that contains the arm and spring are imbedded in the door so the unit is not visible from the front, side or back of the door. Only when the imbedded door magnet passes over the floor magnet does the arm descend from the bottom of the door and connects to the floor magnet.

In various embodiments of the invention, the floor magnet is attached to the floor using an adhesive material such as double-sided tape or double-sided foam and the door magnet is attached to the door using an adhesive material such as double-sided tape or double-sided foam.

In various embodiments of the invention, the floor magnet has a cover that matches the color and/or texture of the floor so the unit containing the floor magnet can be indistinguishable from the floor.

In various embodiments of the invention, the floor magnet can be imbedded in the floor so the magnet does not protrude from the floor.

In various embodiments of the invention, one of the magnets, either the door magnet or the floor magnet, is replaced by a ferrous metal or magnetic-like material, which will attract the magnet attached to the door or floor.

In various embodiments of the invention, the spring that moves the sliding arm to the up and down position is replaced by opposing magnets with either the same polarity or opposite polarity to push or pull the sliding arm up or down.

BRIEF DESCRIPTION OF THE DRAWINGS

Having thus described the various embodiments of the invention in general terms, reference will now be made to the accompanying drawings, which are not necessarily drawn to scale, wherein:

DESCRIPTION OF EMBODIMENTS

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather these embodiments are provided so that this disclosure will satisfy applicable legal requirements.

Figure 1:
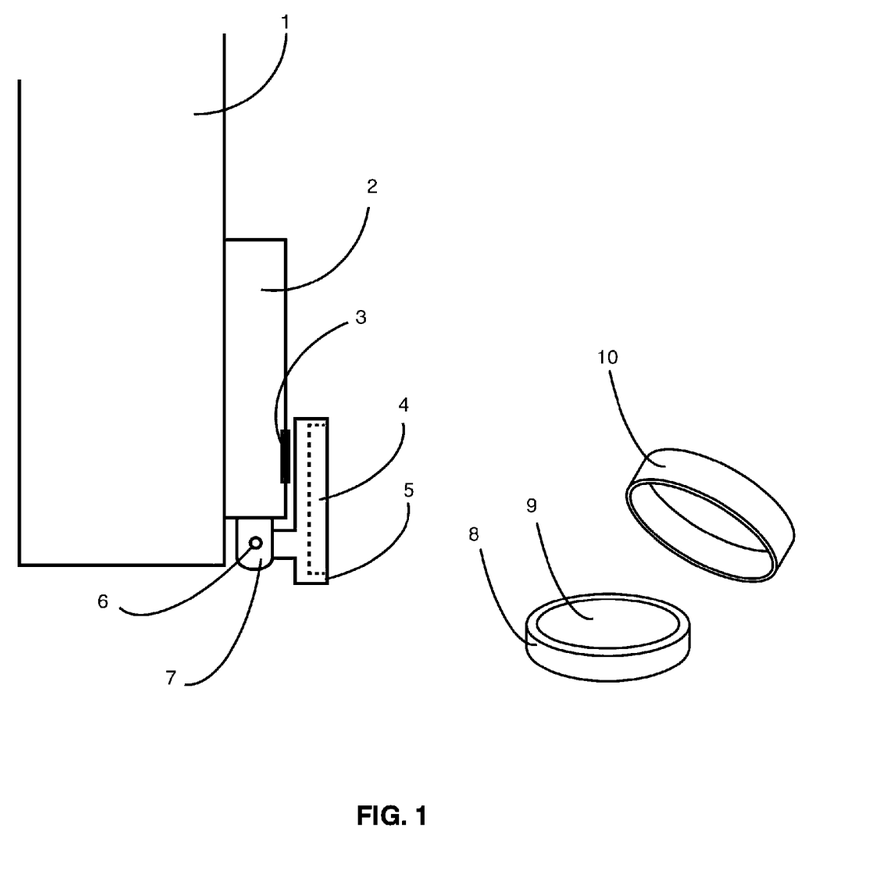
FIG. 1 illustrates a door magnet, floor magnet, and floor magnet cover according to various embodiments of the invention.

FIG. 1 illustrates one embodiment of the invention. The case 2 of the door magnet unit is attached to the bottom of the free-swinging back or front of the door 1 with adhesive. Within the case 2 is the adjustable arm 7 that is held in the up position by a compression spring. The door magnet 4 is in a protective case 5 that attaches to the adjustable arm 7 with a hinge 6. The hinge 6 allows the door magnet protective case 5 and the door magnet 4 to swing down when the door passes over the floor magnet 9. A small magnet 3 attached to the case 2 holds the door magnet 4 and the protective case 5 in the up position through a magnetic connection between magnets so the door can move freely when not over the floor magnet 9. Independent of the door unit is the floor magnet 9 in a floor magnet protective case 8.

After the floor magnet protective case 8 containing the floor magnet 9 are attached to the floor with adhesive material, the floor magnet cover 10, in a color that most closely matches the floor, is placed over the floor magnet protective case 8 and floor magnet 9, so the floor unit is unobtrusive. The floor magnet protective case 8 may also have walls that slope downwards, away from the magnet.

When the door magnet 4 passes over the floor magnet 9 with an opposing polarity, the opposing charges of the magnets form a magnetic attraction, swinging the door magnet protective case 5 on the hinge 6 so the door magnet protective case 5 containing the door magnet 4 swings 90 degrees and becomes parallel to the floor magnet 9. With the larger, oppositely polarized surface areas of the door magnet 4 and the floor magnet 9 facing each other, the magnets are drawn together.

The spring holding the arm 7 in the up position compresses, and the arm 7 is allowed to descend so the door magnet 4 and the floor magnet 9 can be drawn closely together, holding the door 1 in place. The more closely door magnet 4 and floor magnet 9 are together, the greater the pull force of the magnets holding the door in place in accordance with Coulomb's inverse square law. To close the door 1 thereby eliminating the strong magnetic connection between magnets 4 and 9, the door is simply closed in the normal manner by pulling or pushing on the door or door handle. This separates magnets 4 and 9, allowing the compression spring to expand, thereby pulling arm 7 to the up position. As arm 7 snaps up on the spring, it swings protective case 5 up on hinge 6. This allows the opposing attraction of small magnet 3 to attract door magnet 4 and hold the protective case 5 and door magnet 4 in the up position, allowing the door to swing freely.

Figure 2:
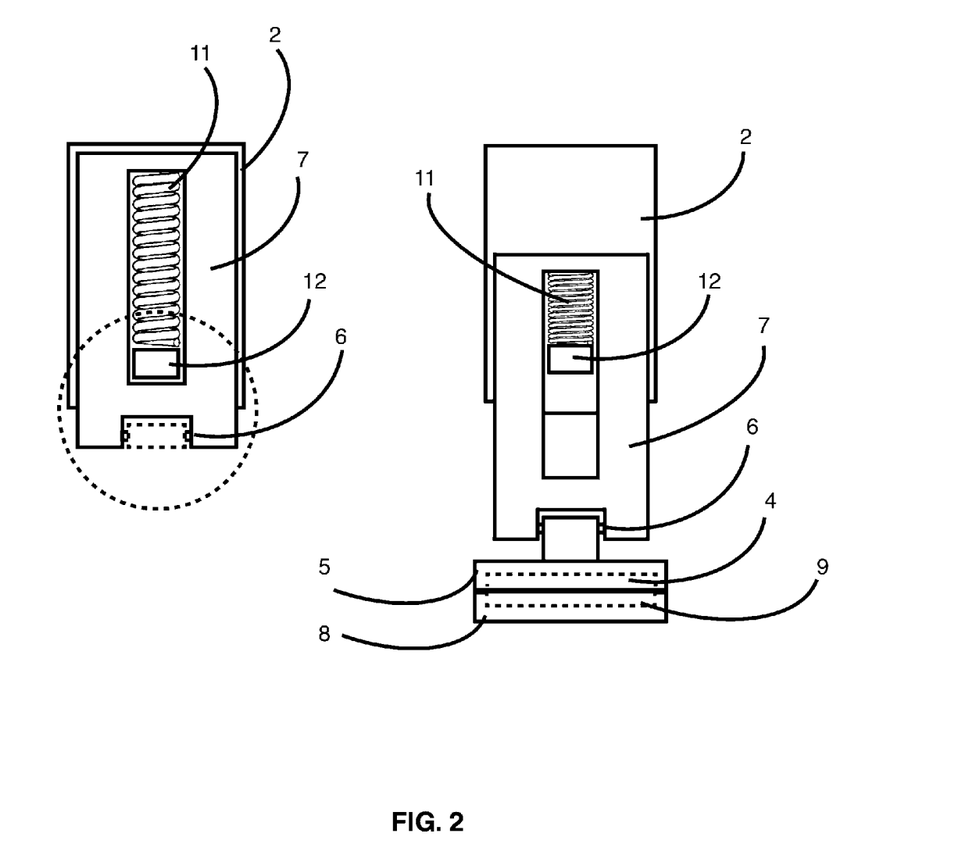
FIG. 2 illustrates the interior of the door magnet with the cover removed according to various embodiments of the invention.

FIG. 2 illustrates one embodiment of the spring mechanism unit of the invention. The figures show the front view (left) and side view (right) with the case 2 cover removed. The spring 11 holds the adjustable arm 7 in the up position when there is no oppositely polarized floor magnet 9 below the door unit. The bottom of the spring 11 rests on a raised area 12 attached to the case 2, which allows the spring to compress and decompress as the adjustable arm 7 moves up and down. When the door unit is positioned over the floor magnet 9, the opposing polarities of the door magnet 4 and the floor magnet 9 cause the protective case 5 to swing on hinge 6, increasing the surface area of the opposing magnets 4 and 9, which increases the pull force, drawing the magnets together. As the magnets 4 and 9 are drawn together, the adjustable arm 7 is pulled down, compressing the spring 11 against the raised area 12. When the door is moved away from floor magnet 9, spring 11 is allowed to expand away from raised area 12, pushing the adjustable arm 7 to the up position, allowing the door to swing freely.

Figure 3A:
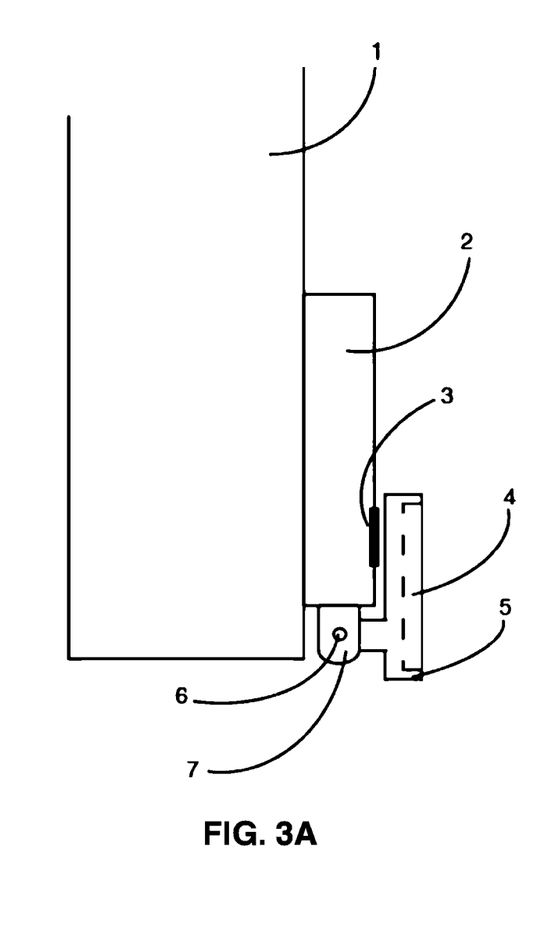
FIGS. 3A-3F illustrates the motion of the door magnet from the side view and front view as it passes over the floor magnet according to various embodiments of the invention.
Figure 3B:
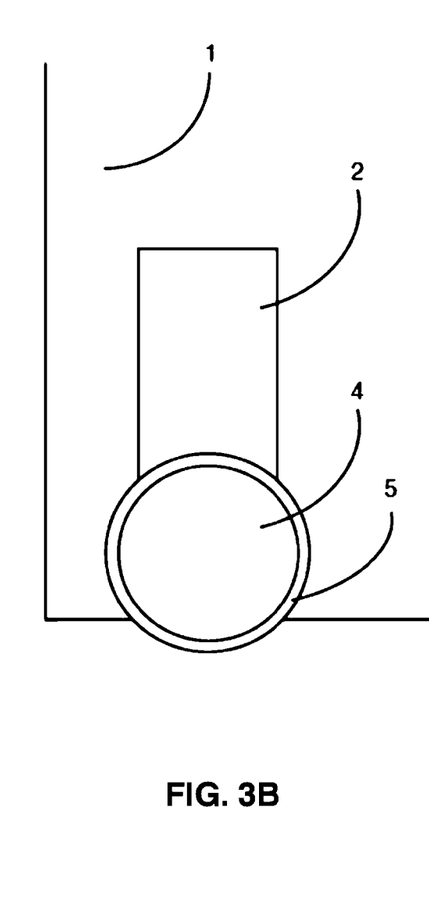
Figure 3C:
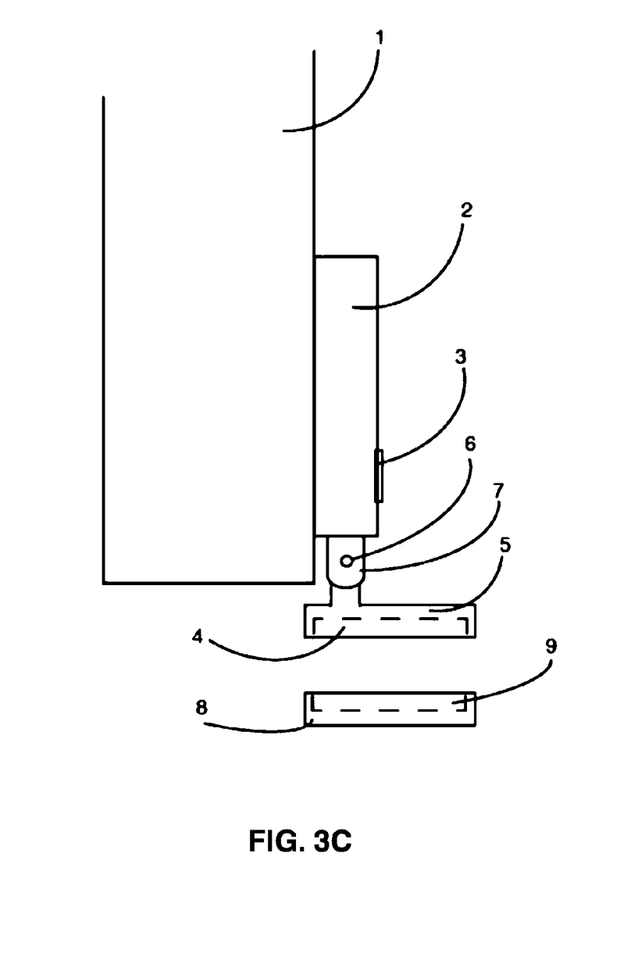
Figure 3D:
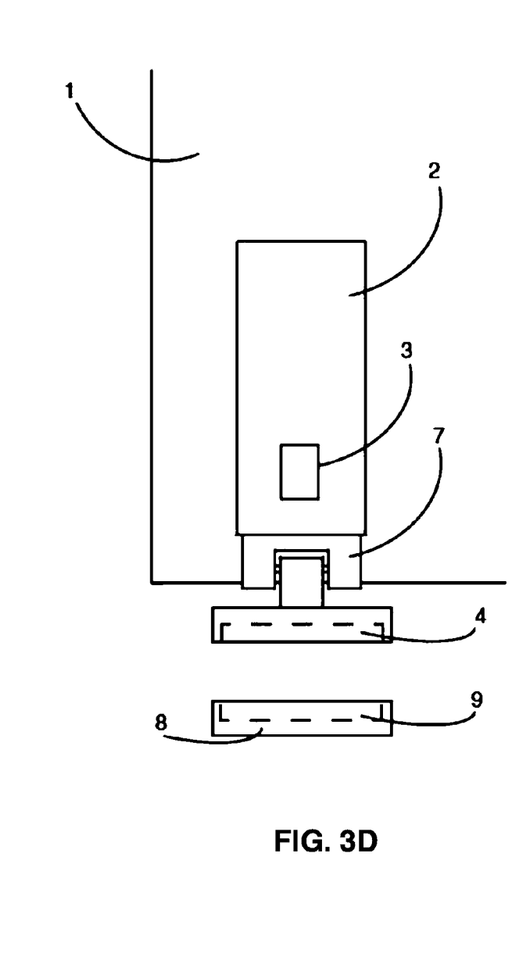
Figure 3E:
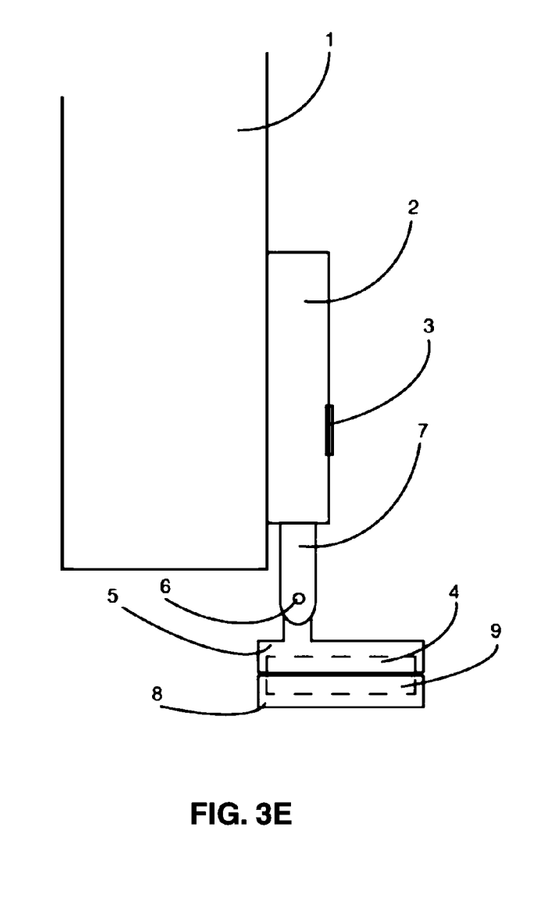
Figure 3F:
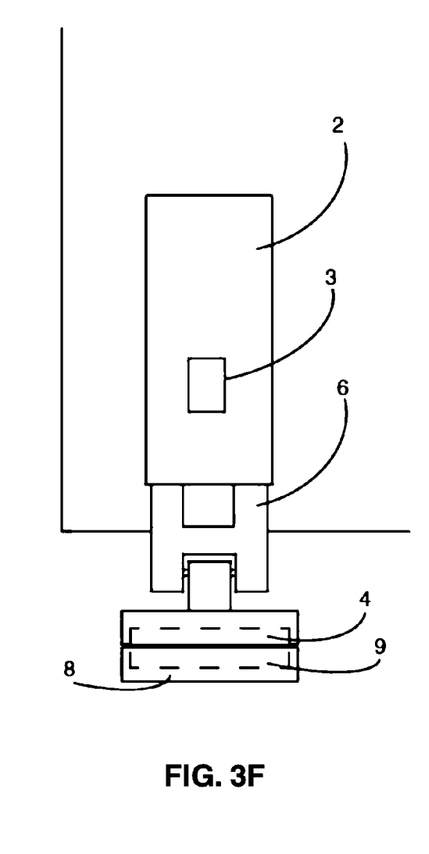

FIGS. 3A-3F illustrates one embodiment of the range of motion of the invention. These figures show three positions of the invention from the side view on the left and front view on the right. FIGS. 3A and 3B show the up position of the adjustable arm 7 when there is no floor magnet 9 on the floor below door magnet 4. FIGS. 3C and 3D show the initial action of protective case 5 and door magnet 4 as it pivots on hinge 6 when it is attracted to floor magnet 9 as the door passes over floor magnet 9. FIGS. 3E and 3F show adjustable arm 7 as it moves to the down position, compressing the spring in case 2. This allows the door magnet and floor magnet to reach their highest level of attraction, thereby holding door 1 in place.

When door 1 is moved forward or aft away from floor magnet 9, the spring in case 1 snaps the protective case 5 and door magnet 4 up 90 degrees, thereby allowing the small magnet 3 to attract door magnet 4, holding the protective case 5 in the up position. The decompression of the spring in case 2 holds the adjustable arm 7 in the up position and the small magnet 3 holds the protective case 5 and door magnet 4 in the up position, allowing the door to swing freely.

Figure 4:
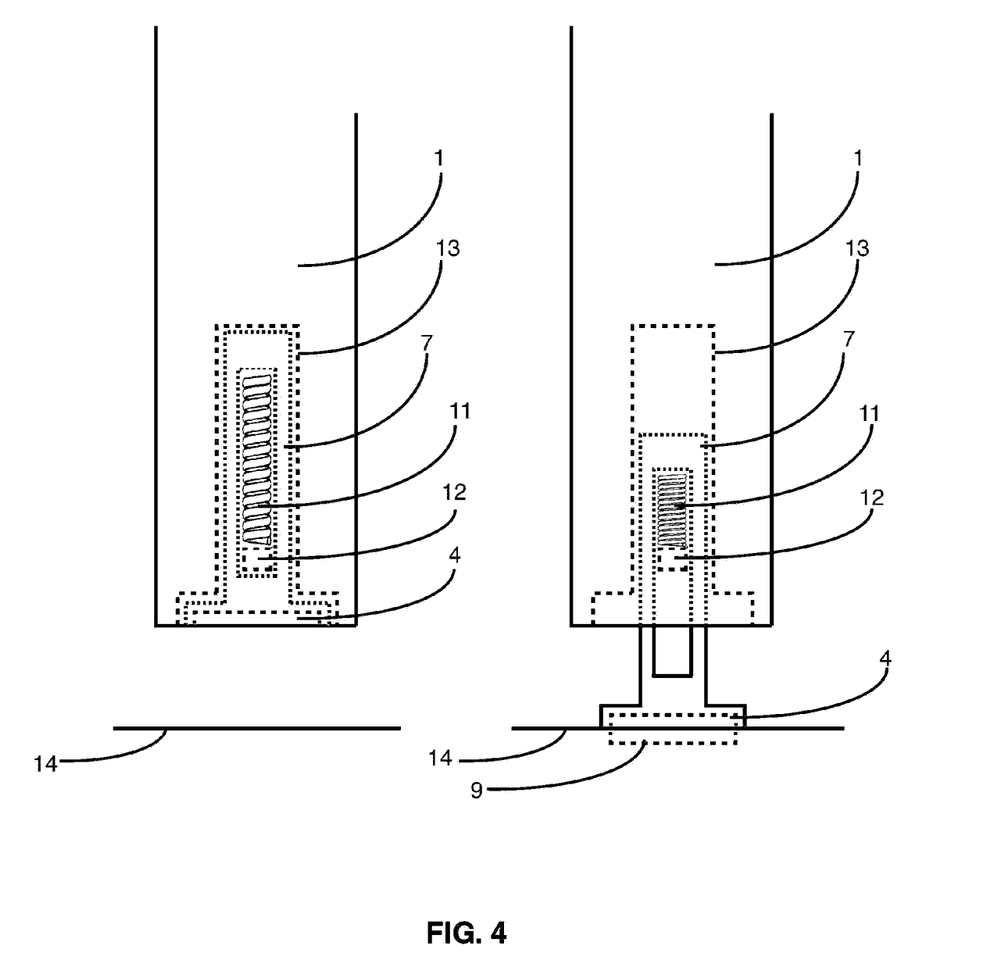
FIG. 4 illustrates the door magnet imbedded inside the door and the floor magnet imbedded in the floor according to various embodiments of the invention.

FIG. 4 illustrates another embodiment of the invention. In this embodiment, the door magnet unit is embedded in the door 1 and the floor magnet 9 is embedded in the floor 14. In the left figure, when the door 1 is not positioned over the floor magnet 9, the door unit is not visible from the front, side or back of the door. This unit is placed in the door by drilling a hole in the bottom of the door 1 and then drilling a larger diameter hole at the entry point of the first hole. The case 13 and internal components are then inserted in the holes and held in place by screws. The adjustable arm 7 is held up in case 13 by the spring 11, which rests on the raised area 12, which is attached to the case 13. The door magnet 4 is attached to the adjustable arm 7. The right figure shows the action when the door passes over the floor magnet 9 imbedded in the floor 14. The door magnet 4 is attracted to the oppositely polarized floor magnet 9, pulling the adjustable arm 7 towards the floor 14 and compressing the spring 11. When the door 1 is moved away from the floor magnet 9, the spring 11 decompresses, moving the adjustable arm 7 to the up position.

Figure 5:
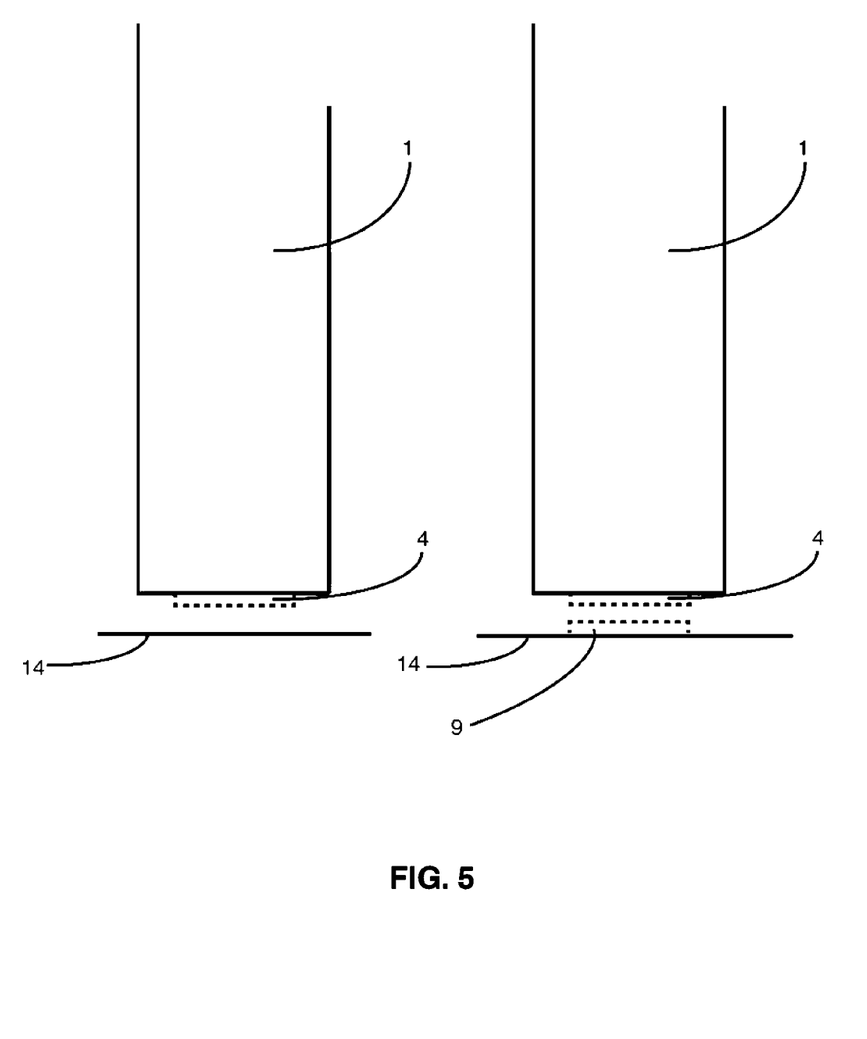
FIG. 5 illustrates a door magnet according to various embodiments of the invention.

FIG. 5 illustrates another embodiment of the invention. In this embodiment, the door magnet 4 is attached to the door 1 and the floor magnet 9 is attached to the floor 14. The polarity of door magnet 4 facing down is opposite of the polarity of floor magnet 9 facing up. If the bottom of the door 1 is close enough to the floor 14, when door magnet 4 is aligned with floor magnet 9, the attraction between the magnets is enough to hold the door in place.

Although this invention has been described in specific detail with reference to the disclosed embodiments, it will be understood that many variations and modifications may be effected within the spirit and scope of the invention as described in the appended claims.

The invention claimed is:

1. A doorstop device for holding a door open anywhere along its arc and preventing the door from opening too wide comprising:

a unit attachable to a door, the unit comprising:

an elongated arm vertically movable into and out of the unit and biased in a raised position;

a case member pivotally connected at a distal end of the elongated arm and having a vertically raised position and a horizontally deployed position; the case member removably fixable in the vertically raised position;

a door magnet disposed in the case member; and a floor mounted magnet attached to the floor and being configured to align with the door magnet so that when the door magnet and the floor mounted magnet are aligned, the door magnet and floor mounted magnet form a magnetic bond, holding the door in place.

2. The doorstop device of claim 1, wherein the unit is attached to the door with an adhesive.

3. The doorstop device of claim 1, wherein the floor mounted magnet is attached to the floor with an adhesive.

4. The doorstop device of claim 1, wherein the floor mounted magnet has a cover that matches the color or material of the floor that the floor mounted magnet is mounted to.

5. The doorstop device of claim 1, wherein the floor mounted magnet has a cover that slopes down along the outer edge.

6. The doorstop device of claim 1, wherein the floor mounted magnet is imbedded in the floor.

7. The doorstop device of claim 1, wherein the floor mounted magnet is installed at a location along the door's arc.

8. The doorstop device of claim 1, wherein the door magnet is located along the bottom of the front or back of the door.

9. The doorstop device of claim 1, wherein the door magnet or the floor mounted magnet are circular.

10. The doorstop device of claim 1, wherein the door magnet is mounted so as to be disengageable via a lateral pull force from the floor mounted magnet.

11. A doorstop device for holding a door open anywhere along its arc and preventing the door from opening too wide comprising:

a unit comprising, an adjustable-height arm attachable to a door, the adjustable-height arm configured to lower and biased to raise relative to the door; and a magnet member pivotally connected to a free end of the adjustable-height arm so as to pivot between a generally horizontal position and a generally vertical position, the magnet member removably locking in the generally vertical position;

and a floor mounted magnet attachable to the floor and configured to be selectively aligned with the magnet member such that when the door mounted magnet and the floor mounted magnet are aligned, the adjustable-height arm and the door mounted magnet can slide down, allowing the door mounted magnet and floor mounted magnet to form a magnetic bond, holding the door in place.

12. The doorstop device of claim 11, wherein the adjustable-height arm is forced upwards by an internal spring when the door mounted magnet is not aligned with the floor mounted magnet, so the door can move freely.

13. The doorstop device of claim 11, wherein said unit further comprises an arm magnet configured to raise the adjustable-height arm when the door mounted magnet is not aligned with the floor mounted magnet.

14. The doorstop device of claim 11, wherein the adjustable-height arm is mounted inside the door.

* * * * *